T. G. SAXTON.
WRIST PIN.
APPLICATION FILED NOV. 17, 1920.
1,404,654.
Patented Jan. 24, 1922.
2 SHEETS—SHEET 1.
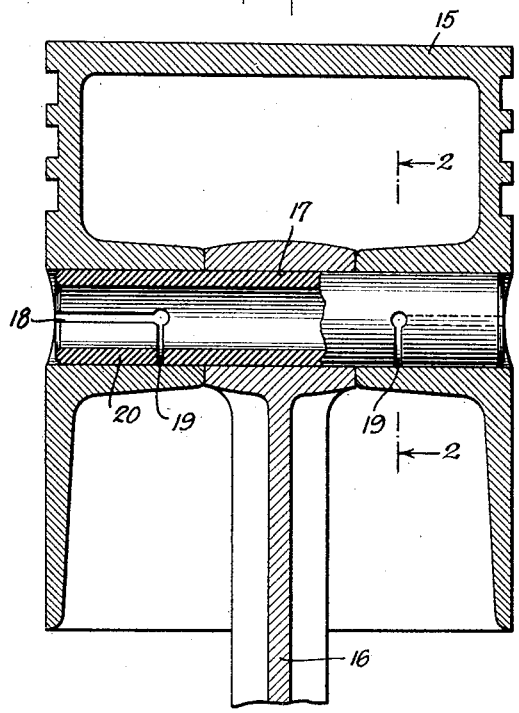
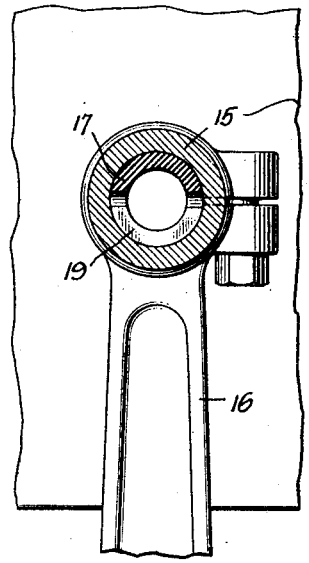
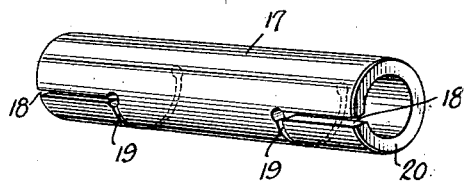
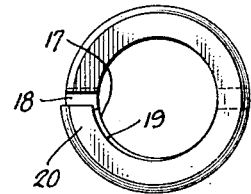
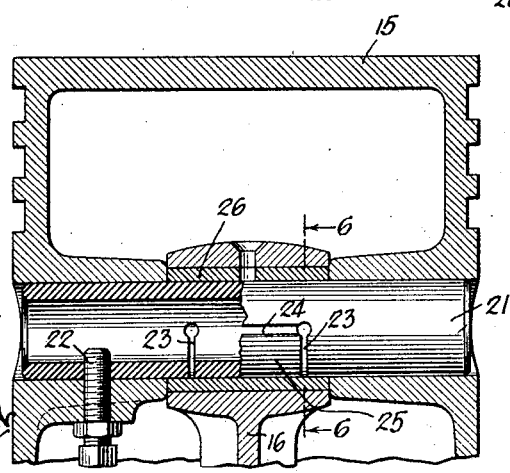
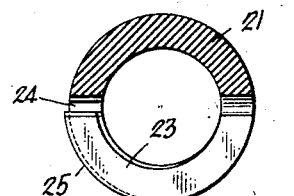
INVENTOR
T. G. SAXTON
BY Munn & Co.
ATTORNEYS

T. G. SAXTON.
WRIST PIN.
APPLICATION FILED NOV. 17, 1920.

1,404,654.

Patented Jan. 24, 1922.
2 SHEETS—SHEET 2.

WITNESSES
Frederick Diehl.

INVENTOR
T. G. SAXTON
BY
ATTORNEYS

UNITED STATES PATENT OFFICE.

THOMAS G. SAXTON, OF BOONTON, NEW JERSEY, ASSIGNOR OF ONE-FOURTH TO PAUL G. COLEMAN, OF NEW YORK, N. Y.

WRIST PIN.

1,404,654.  Specification of Letters Patent.  Patented Jan. 24, 1922.

Application filed November 17, 1920. Serial No. 424,680.

*To all whom it may concern:*

Be it known that I, THOMAS G. SAXTON, a citizen of the United States, and resident of Boonton, in the county of Morris and State of New Jersey, have invented a new and Improved Wrist Pin, of which the following is a full, clear, and exact description.

My invention relates to a wrist pin, and aims to provide a device of this nature, more particularly intended for use in connection with the association of connecting rods with the pistons of an engine.

In motors, and more particularly motors utilizing a piston capable of being reciprocated into a cylinder, it is well understood that a connecting rod is utilized for furnishing the connecting medium between each of the pistons and the crank shaft to transmit the reciprocating power of the former in the form of rotation to the latter.

Also, pins commonly termed "wrist pins" have been associated with the piston and connecting rod adjacent their points of contact with each other, to connect these elements.

Two classes of wrist pins have usually been employed, the first providing a pin fixedly connected to the piston, and having the connecting rod movably secured to the pin; the second including a pin to which one end of the connecting rod is fixedly secured, the ends of said pin extending beyond said connecting rod, and in contact with the piston, and movable within openings in the latter.

It will be understood that in either instance, the oscillation of the wrist pin has been through an arc of approximately 20° from the vertical. Thus an uneven amount of wear has been imparted to the pin and members with which it contacts, which, due to the force exerted by the piston upon the expansion or explosion stroke, and by the connecting rod upon the expelling, and other strokes, as in the case of an internal combustion engine, has resulted in an oval wear of the members connected by the pin, and in some instances, the pin itself.

This wear has been particularly aggravated due to the fact that the grinding of the pins has rarely been such as to provide a fit of less than one to five thousandths of an inch. Thus a small amount of hammering action has come into being upon the parts being entirely new, and this hammering action has further enhanced the wear of the parts in an uneven manner.

Having these defects in mind, I have now constructed a wrist pin which may be either fixedly secured to the piston or connection rod, and which will fit the parts with which it is associated, to a far better extent than is now the case.

A further object of my invention is the construction of a device of this nature in which the hammering and oval wear of the parts will be eliminated.

A still further object of my invention is the construction of a pin adapted for use in coupling a piston with a connecting rod, and which will automatically take up any play which may come into existence, even although the parts are adjusted with a far greater degree of nicety than is now the case.

Reference is had to the attached sheets of drawings which show my invention constructed to meet the necessities of various types of connections resorted to between the piston and connecting rod, and in these drawings, Figure 1 is a sectional, partly fragmentary view of a piston and connecting rod, coupled together by means of my improved type of wrist pin, the latter being arranged to meet the requirements of that class of piston and connecting rod in which the latter is fixedly secured to the wrist pin, the former having sliding contact therewith.

Figure 2 is a sectional side view taken in the direction of the arrows, and along the line 2—2 of Figure 1.

Figure 3 is a perspective view of a wrist pin constructed in accordance with the illustration of the parts in Figure 1.

Figure 4 is an end view thereof.

Figure 5 is a sectional, partly fragmentary side view of a piston and connecting rod, coupled together by means of a wrist pin constructed to meet the requirements of this type of engine, which includes a piston to which the wrist pin is fixedly secured, the connecting rod having sliding contact therewith.

Figure 6 is a cross sectional view of my wrist-pin taken on line 6—6 of Figure 5.

Figure 7:
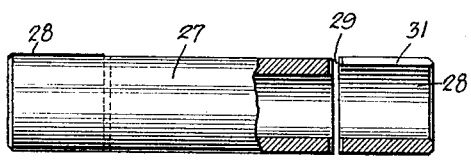
Figures 7 and 8 are fragmentary side and end views respectively of a further form of wrist pin, which may be used to advantage.
Figure 8:
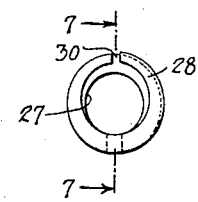

In all of these views the reference numeral 15 indicates the piston which may be of any suitable type, and with which a connecting rod 16, also of any desirable type is associated by means of my improved type of wrist pin.

Referring more particularly to Figures 1 to 4, it will be seen that a wrist pin constructed in accordance with my invention, conveniently includes a body portion 17, which is provided adjacent its ends with longitudinally extending splits 18, each continued in the form of a circumferentially extending split portion 19, which latter preferably has its end at a point diametrically opposite from the point of introduction of the longitudinal and circumferentially extending splits.

By this construction, what might be conveniently termed a resilient screw 20 is formed which has its outer edge, i. e. that edge forming one of the side walls of the longitudinally extending split 18, sprung beyond the plane in which the outer face of the body portion 17 of the pin lies, and as has been clearly shown in Figure 4.

Now referring more particularly to the specific application of a pin constructed in accordance to this method, it will be seen, reference being had to Figures 1, and 2 that the connecting rod 16 is firmly secured to the body portion 17 of the pin, and conveniently at a point substantially intermediate the extremities of the latter.

These end portions project into a transversely extending bore forming a part of the piston 15, and it will readily be appreciated that the resilient skirt portions 20 of the pins will spring to completely fill out the bore, aside from the fact that they will allow for the automatic taking up of any amount of play of the pin with respect to the bore of the piston 16. In this connection it is to be noted that the pin is constructed in such a manner as to preferably permit of its body portion 17 extending to a certain distance into the bore of the piston 15, and, as has been illustrated in Figure 1, to provide a rigid bearing surface adapted to cooperate with the piston and in which no resiliency will be permitted, this rigid bearing surface naturally being primarily ground with a view of providing, as nearly as possible a true fit between the bore of the piston 15 and the diameter of the pin.

In the form of wrist pin illustrated in Figures 5 and 6 it will be seen that the ends of the pins 21 are solid, in contradistinction to the form illustrated in Figures 1 to 4. It will also be noted that in this form of pin, that the solid end portions of the same are fixedly secured to the piston 15 by any suitable means such as the lug 22. Further a pair of semi-circular circumferentially extending slots 23 are provided through the body of this type of pin, these slots being each preferably equidistant from the edges of the pin, it being also noted that these slots are connected together by means of a further longitudinally extending split or slot 24, whereby to provide a resilient skirt 25, having all of the qualities of the skirts 20, and having, as has been clearly illustrated in Figure 6, its free edge lying in a plane beyond that of the body portion of the pin.

This type of pin is for use in connection with that type of motor employing a pin rigidly secured to the piston, and being in movable contact with the connecting rod, and it has been customary to provide a bushing intermediate these two latter elements to provide a bearing surface.

With this in view, I conveniently utilize any suitable type of bushing 26 fixedly secured to the upper end of the connecting rod 16, which latter slidably encircles a center portion of the pin, and is adapted to have its inner face in contact with the resilient skirt 25 of the pin, it being noted that in this form also, that portion of the member connected to the second member, and having movable contact with the wrist pin is adapted to extend beyond the skirt 25 so as to contact with the rigid body portion of the pin to afford a fixed bearing surface.

In both of the previously described forms of pins, it will be understood that the pin is of a resilient material, so that the end portions of the skirt extends beyond the normal plane of the pin. If it is desired to construct a pin of a more resilient material, this may readily be accomplished, assuming that the pin is to be adapted to the arrangement of the piston and connecting rod, as has been illustrated in Figures 1 and 2 by boring the end portion of the pin 27 eccentrically, as has been indicated by the reference numeral 28.

These eccentric portions are then provided with a circumferentially, substantially semi-circular split 29, which is continued in the form of a longitudinally extending split 30, to provide a skirt 31, having its outer edge extending to a plane beyond that of the outer surface of the pin 27. This, as will readily be appreciated, will serve to provide the same result as is achieved by the construction of the pin shown in Figures 1 to 4, where the type of pin employed is of a rigid variety of material.

Figure 9:
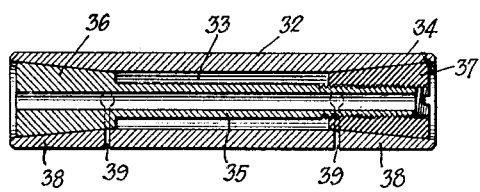
Figure 9 is a sectional side view of a wrist pin embodying my invention, and adapted for use in connection with parts as illustrated in Figures 1 and 2.
Figure 10:
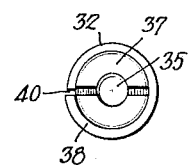
Figure 10 is an end view thereof.
Figure 11:
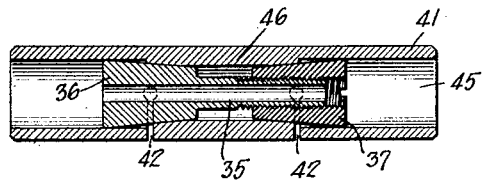
Figure 11 is a sectional side view, similar to that shown in Figure 9, but showing them as adapted for use with the parts as illustrated in Figure 5.
Figure 12:
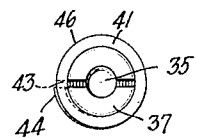
Figure 12 is an end view thereof.

On the other hand, if a rigid type of material is employed, in which the skirt 31 is to be susceptible of adjustment according to the necessities of wear, and which is to be associated with the form of piston and connecting rod illustrated in Figures 1-2, it will be seen that this may be accomplished by constructing a pin more particulary illustrated in Figures 9 and 10, which includes a body portion 32, provided with a conventional bore 33, the inner face of which is, however, tapered adjacent the ends to provide wedge surfaces 34.

The bolt 35 is disposed within the bore 33, and this bolt is preferably formed with a tapered head 35, conforming to the wedge shaped ends 34 of the bore, the opposite end of the bolt being conveniently provided with screw threads adapted to afford a communication for a longitudinally movable nut 37, also corresponding to the degree of taper of the end portion of the bore 33.

Obviously upon the bolt and nut being extended longitudinal to provide the correct adjustment, the skirts 38 of the pin are formed in the usual manner by providing circumferentially extending slots 39, which latter co-operates with longitudially extending split portions 40 to form the screws 38.

Assuming now that a pin of the type illustrated in Figures 9 and 10 is to be adapted for use in connection with the arrangement of piston, and connecting rod, in the manner illustrated in Figures 5 and 6, it will be appreciated that this may be accomplished by providing a pin, having rigid end portions 41, the center portion thereof being conveniently constructed, as in the type of pin illustrated in Figures 5 and 6, i. e. formed with circumferentially extending slits 42, connected together by a longitudinally extending split or slit 43, to provide a skirt 44. The bore 45 of the pin is, in this instance, formed with a reduced center portion 46, presenting oppositely extending inclined wedge faces, with which the head 36 of the bolt 35, and nut 37 co-operate to permit of a positive degree of expansion on the part of the skirt 43.

Thus it will be seen that I have constructed a pin which shall reduce to a minimum, if not entirely eliminate, the hammering action existent at the point of connection of the piston with the connecting rod which has resulted in a great amount of undue wear and foreign noises coming into existence, aside from the general imparting inefficiency on the part of the motor.

This is to be attributed, due to the positive bearing surface afforded between the movable parts, this bearing surface being further provided with elements compensating for any amount of wear, to take up play, aside from the fact that the initial final adjustment is permitted which will reduce the liability of initial play.

Obviously numerous modifications of structure might readily be resorted to without in the least departing from the spirit of my invention, which I claim as—

1. A wrist pin comprising a body portion formed with a bore, said pin being also formed with a plurality of circumferentially extending slits connected together by a longitudinally extending slit, whereby to provide a skirt having its free edge extending to a plane beyond that occupied by the body of said pin.

2. A wrist pin comprising a body portion formed with a bore, said pin being also formed with a plurality of circumferentially, semi-circular extending slits connected together by a longitudinally extending slit, whereby to provide a skirt having its free edge extending to a plane beyond that occupied by the body of said pin.

3. A wrist pin including a body portion and a resilient skirt forming a part of said body portion, said skirt normally having its outer end extending to a plane beyond that in which the outer face of the body of said pin lies.

4. A wrist pin including a body portion, aprons forming a part of said body portion, the outer ends of said aprons normally lying in a plane beyond that occupied by the outer face of the body portion.

5. A wrist pin including a body portion formed with circumferentially extending splits and longitudinally extending splits whereby to provide aprons for their free edges normally lying in a plane beyond that occupied by the outer face of the body portion.

6. A wrist pin including a body portion formed with slits whereby to provide an integral apron, said body portion being formed with an uninterrupted bore, and a single means arranged within said bore and adapted to force the free edges of said apron to occupy a plane beyond that occupied by the outer face of the body portion of said pin.

THOS. G. SAXTON.